(12) United States Patent
Vaidyanathan et al.

(10) Patent No.: US 6,305,008 B1
(45) Date of Patent: Oct. 16, 2001

(54) AUTOMATIC STATEMENT COMPLETION

(75) Inventors: Shankar Vaidyanathan, Bellevue; Philip Lucido, Redmond; Sundeep Bhatia, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/191,781

(22) Filed: Nov. 13, 1998

(51) Int. Cl.[7] .............................. G06F 17/00; G06F 17/30
(52) U.S. Cl. ................................. 717/4; 707/104
(58) Field of Search ....................... 717/1, 2, 3, 8, 717/4; 707/530, 534, 104

(56) References Cited

U.S. PATENT DOCUMENTS

| | | | |
|---|---|---|---|
| 4,931,928 | * 6/1990 | Greenfeld | 717/8 |
| 5,813,019 | * 9/1998 | Van De Vanter | 707/512 |
| 6,016,467 | * 1/2000 | Newsted et al. | 704/9 |
| 6,061,513 | * 5/2000 | Scandvva | 717/1 |

* cited by examiner

Primary Examiner—Paul V. Kulik
(74) Attorney, Agent, or Firm—Woodcock Washburn Kurtz Mackiewicz & Norris LLP

(57) ABSTRACT

Automatic statement completion is disclosed. In one embodiment, a system includes an editor to provide for developing source code for a computer program, and a database containing information on entities in the source code. The system also includes a completion module invoked by the editor upon the occurrence of a predetermined event and operative to display a set of valid entities in response to a pre-determined event.

26 Claims, 5 Drawing Sheets

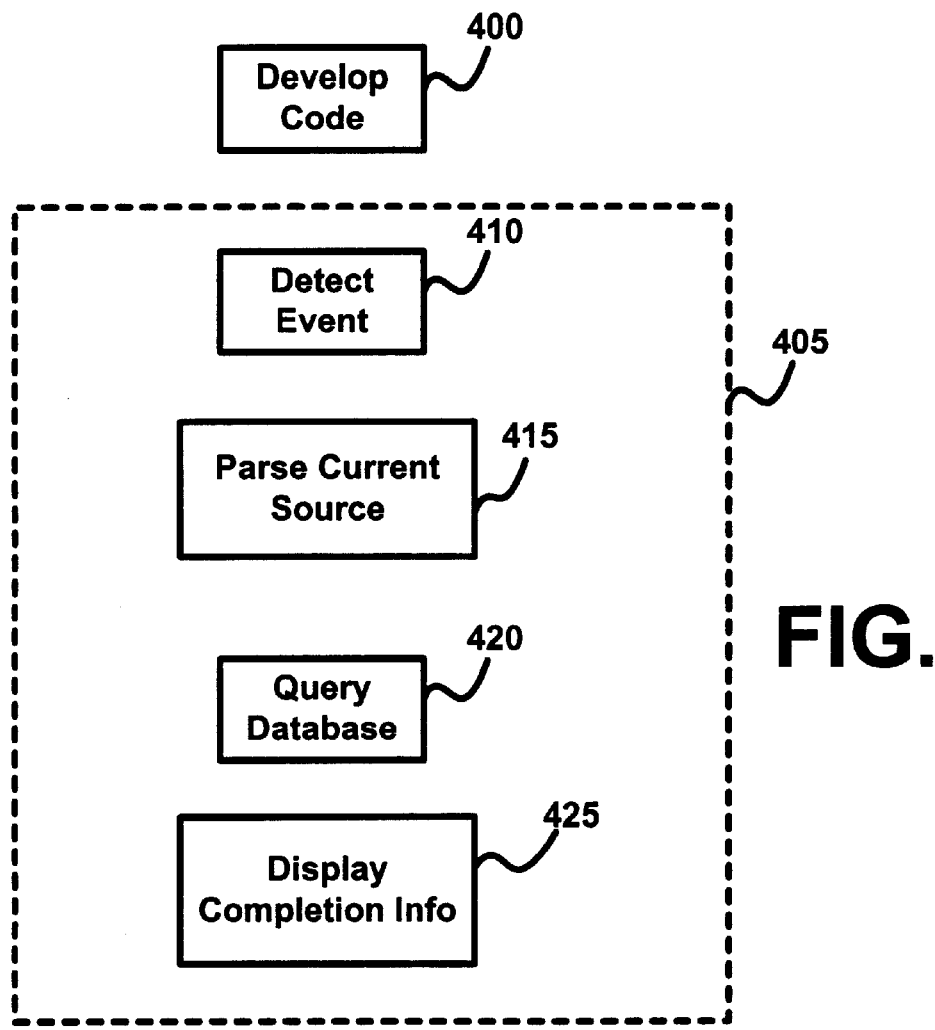

AUTOMATIC STATEMENT COMPLETION

RELATED APPLICATIONS

This application is related to the following commonly assigned copending applications, all of which were filed on Nov. 13, 1998:

"Dynamic Parsing"—U.S. patent application Ser. No. 09/191,499,

"Automated Help System for Reference Information"—U.S. patent application Ser. No. 09/191,757, and "Indexing and Searching Across Multiple Sorted Arrays"—U.S. patent application Ser. No. 09/192,057.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

FIELD

This invention relates generally to software development environments, and more particularly to automatic completion of statements.

BACKGROUND

Software programming languages have become more powerful over time through the addition of features and capabilities allowing developers to define procedures and data structures to meet their needs. However, the increased power and capability of modern programming languages has also added to their complexity. In addition, the programs developed using the programming languages have become larger and more complex, with one program typically comprising many different source code files.

As a result, a market for compilers and interpreters—which are computer programs that turn source code of a program into an executable version that can actually be run on a computer—that make programming easier has proliferated. One manner by which compilers and interpreters have become somewhat easier to use is through the use of the Integrated Development Environment (IDE). These environments typically have browsers and editors allowing developers to edit multiple source files. In addition, for object oriented languages, the IDE may also provide a browser allowing the developer to navigate and view the class hierarchy.

While browsers are an improvement to compilers and interpreters, several problems remain. First, in order to look up the definition of a complex data structure, the user must locate the file containing the data structure definition, or must locate the class name in the class hierarchy browser.

Second, the user must locate the data structure definition in the file, which typically involves either scrolling through the file or using a text search capability to search through the file.

Third, once the definition has been located, the user must swap back and forth between the window containing the definition of the structure (either in a file window or a class hierarchy window) and the window in which the developer is currently adding code referencing the structure.

Finally, once the definition has been located, the user must manually insert the appropriate data structure reference into the code window.

SUMMARY

The above-identified problems, shortcomings and disadvantages with the prior art, as well as other problems, shortcoming and disadvantages, are solved by the present invention, which will be understood by reading and studying the specification and the drawings. In one embodiment, a system includes an editor and a completion module. The editor provides an environment for developing source code for a computer program, where the source code has statements, and the statements have expressions and entities. The expressions and entities in the statements can be made up of multiple components.

The completion module is invoked by the editor upon the occurrence of an event. Examples of events include when an identifiable first component is entered, when a hot key is entered, after a mouse cursor has been positioned over a component for a predetermined amount of time, and when a separator character between two components is entered by the developer. The completion module then displays context-sensitive information allowing the developer to rapidly complete the expression.

Thus, embodiments of the invention provide for advantages not found in previous systems. While a programmer is developing or writing source code for a program, in one embodiment the completion module is invoked as the programmer is writing the code. A list of potential completion candidates is presented to the developer, who can then pick the desired candidate or continue typing. The list of candidates is automatically supplied thereby freeing the developer from having to consult printed or on-line documentation, class hierarchies or other source code files. In this manner, development of computer programs is made easier and more productive as compared to previous systems.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
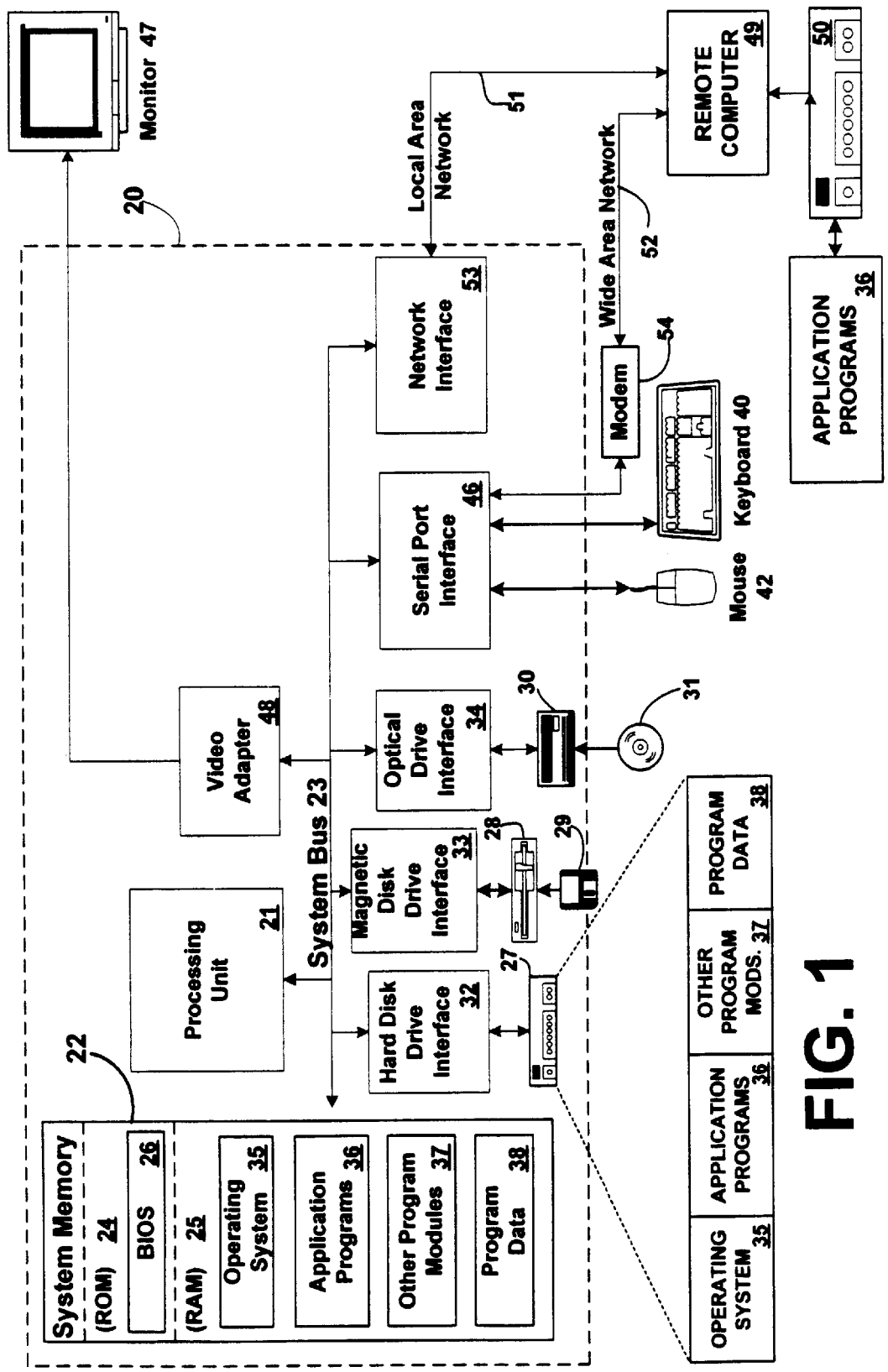
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
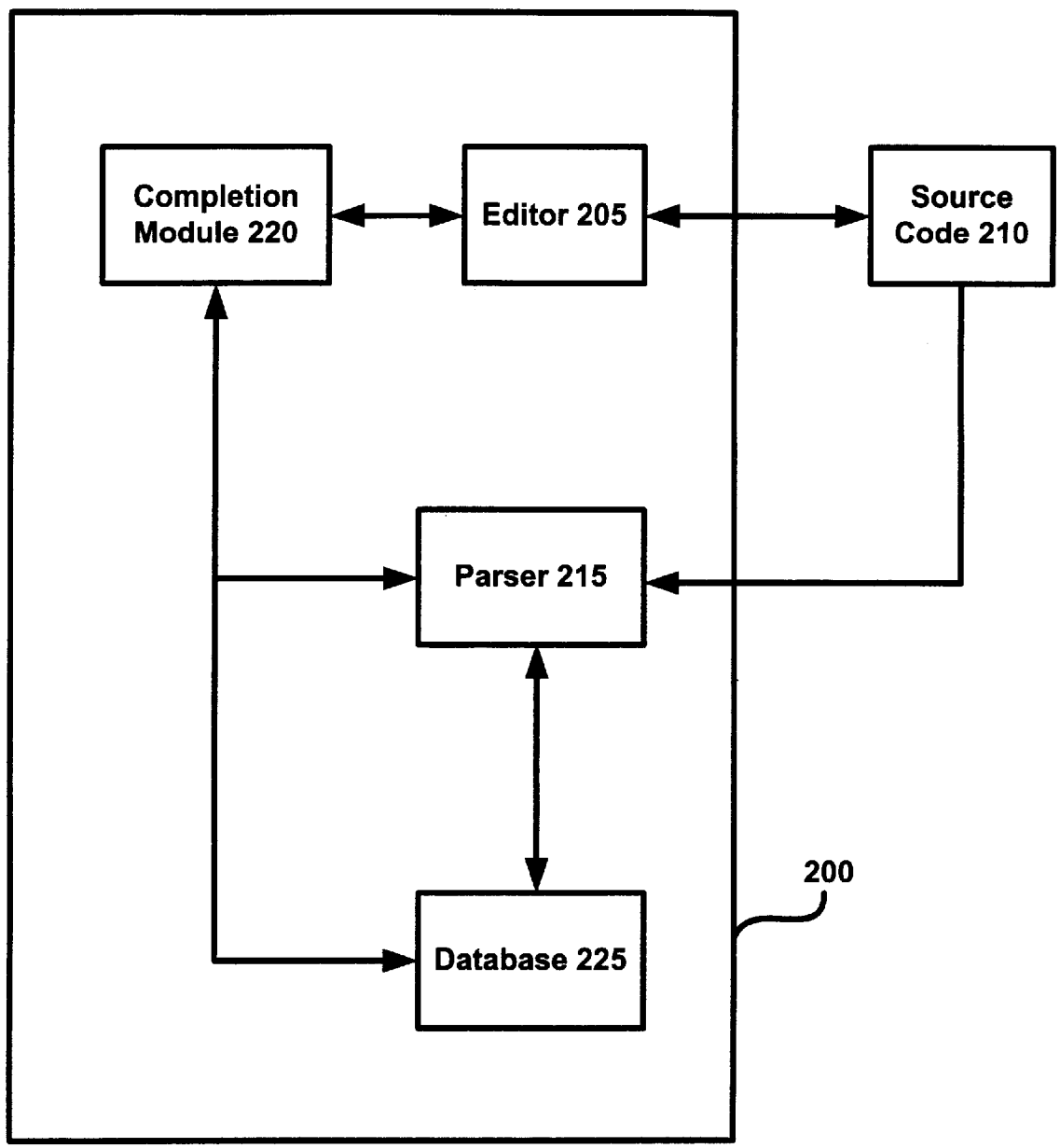
FIG. 2 shows a block diagram of a system according to one embodiment of the invention.

In this section of the detailed description, a description of a computerized system according to an embodiment of the invention is provided. The description is provided by reference to FIG. 2. Referring now to FIG. 2, a system according to an embodiment of the invention includes an IDE 200. As shown, the IDE 200 includes an editor 205, parser 215, completion module 220 and database 225. Those of ordinary skill within the art will appreciate that the IDE 200 also may include other components, not shown in FIG. 2; only those parts necessary to describe the invention in an enabling manner are provided. The parser 215 of IDE 200 may be capable of parsing any of one or more programming languages known in the art; the invention is not so limited. For example, the parser 215 can, in various embodiments, parse the following programming languages: C, C++, Pascal, Visual BASIC, Java, etc., all of which are known in the art. In addition, IDE 200 may also include what is known in the art as an interpreter.

The source code 210 is a text description of a computer program, as written in a given programming language by or for one or more computer programmers. Typically and as is known in the art, the source code comprises a series of statements which in turn are comprised of expressions. These statements are composed of various programming language tokens, which are combined to form declarations and definitions that describe the entities that make up the computer program. Identifiers are used to identify particular entities in the program, and include function names, variable names, class names, macro names and template names. Those of ordinary skill in the art will recognize that various entities and identifier mechanisms are used in various programming languages. The expressions in a statement can also typically be divided into multiple component parts.

The editor 205 of the IDE 200 provides for the developing (writing) of the source code 210 of a computer program.

The parser 215 operates to parse the source code 210 according to the parsing rules applicable to the programming language. In one embodiment of the invention, the parser used to implement method only needs to parse a subset of the source code, typically the current function or method being edited. This is desirable because parsing a complete file can take more time than a developer is willing to tolerate.

In an embodiment of the invention, several enhancements are added to the parser to support parsing only a portion of the code. First, because the code is incomplete (i.e. the developer is in the midst of writing the code) the parser must include heuristics to ignore certain non-fatal errors. Among these errors are missing statement terminators, missing closing parenthesis, missing function terminators and the like. In addition, the parser must be able to ignore errors resulting from unknown identifiers, unknown data types and unknown or missing function parameters. The parser must also be able to recover from what would otherwise be considered a fatal error and continue parsing the remaining code following the section causing the error. Also, the parser must be able to make reasonable determinations as to how conditionally compiled sections of code are to be parsed.

Second, it is desirable that the parser be able to parse subsets of code contained in memory buffers, rather than having to read the code from a file. This is desirable because it improves parsing speed by eliminating the need to save buffers to a disk file and provides feedback to the programmer while they are modifying their code.

Completion module 220 is invoked by editor 205 upon the occurrence of an event and employs the method described below with reference to FIG. 4 to automatically complete certain expressions and statements as the developer is editing source code 210.

Database 225 is typically a file comprising a database that, in one embodiment of the invention, is used by the parser to store information including, but not limited to, class definitions, member data types, and reference information such as source file names and line numbers where a token or identifier is defined or referenced. In an embodiment of the invention, database 225 is a dynamic representation of various aspects of the program under development, and is dynamically queried and updated by the parser as the source code 210 is modified or added to by the developer. The dynamic update of the database 225 is further described in the patent application entitled "Dynamic Parser", which has been previously incorporated by reference.

Database 225 typically includes information not only from source code 210, but also includes information from other sources including system header files, Microsoft Foundation Class (MFC) header files and ActiveX Template Libraries (ATL), all of which are known in the art. The database 225 stores an indicator as to which of the above-mentioned sources was used to populate the particular database record. In one embodiment of the invention, database 225 is referred to as an NCB (No Compile Browse) file, and is populated and maintained by the parser module 215.

In an alternative embodiment of the invention, database 225, while appearing as one database to the user, is actually comprised of multiple stores or databases. In this embodiment, a first database, referred to as a project database, is dynamically updated by the parser, as described above. In addition to the first dynamically updated database, one or more pre-built databases exist. The pre-built databases contain information that seldom changes, such as operating system definitions and header files, Microsoft Foundation Class definitions and header files, and the ActiveX Template Library referred to above. Those of ordinary skill in the art will recognize that other class definitions and header files could be included in the pre-built database. It is desirable to provide such a pre-built database because of the large amount of information that is provided by the class definitions and header files. This information seldom changes, and therefore does not need be re-parsed and stored in the dynamically updated database. This allows the parser to dynamically parse the user developed code, which does change frequently, in an acceptable amount of time.

Thus, in accordance with one embodiment of the invention, the system of FIG. 2 operates as follows. A developer drafts the source code 210 within the editor 205. As the developer is writing the source code 210, one of the components of IDE 200 detects an event and invokes completion module 220. Completion module 220 then uses dynamic parser module 215 to parse the code fragment using information from database 225, and provides context-sensitive choices to the developer to complete the current statement. In one embodiment of the invention, the predetermined event is when certain programming language defined constructs are entered by the developer. In an alternative embodiment, the completion module is invoked when the user enters a hot key. A hot key, as is known in the art, is a keyboard character or sequence of characters which, when pressed, invoke specialized functionality. In a still further embodiment, the completion module is invoked when a cursor controlled by a pointer device is positioned over an expression for at least a predetermined amount of time. In yet another embodiment of the invention, the completion module is invoked when the user selects a menu entry or an icon.

In one embodiment of the invention, the completion information presented to the user is dependent on the context provided by the current source code and the position of the cursor within the source code. For example, if the cursor is positioned in an area containing white space, the completion information presented to the user includes all language tokens that are potentially valid at that point in the code. This would include local variables, global variables, function identifiers, class identifiers and any other token that is valid at that point in the source code. If the cursor is positioned near a class member reference, the completion information presented is narrowed to those identifiers that are attributes of the class, such as class member attribute identifiers and class function identifiers. If the cursor is positioned after a variable or class attribute identifier, the completion information presented includes operator tokens. In general, the information presented comprises those language tokens that are potentially valid at the point in the source code identified by the cursor position.

Figure 3A:
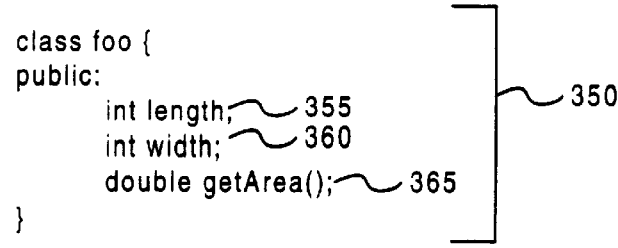
FIGS. 3(a), 3(b) and 3(c) show a class description and diagrams of representative screen shots of an embodiment of the invention in which an automatic completion module has provided context-sensitive data; and, FIGS. 4(a) and 4(b) show a flowchart and source code sample illustrating a method according to one embodiment of the invention.
Figure 3B:
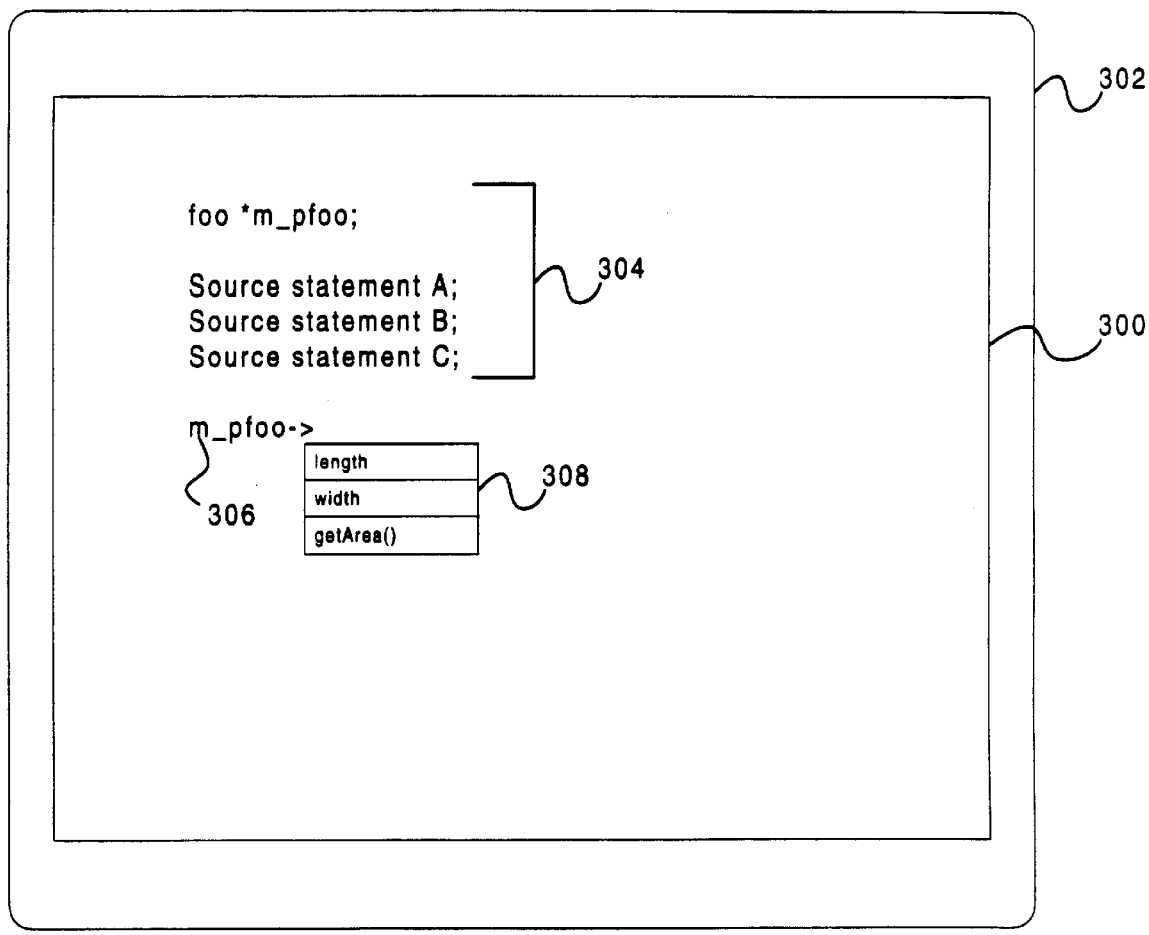
Figure 3C:
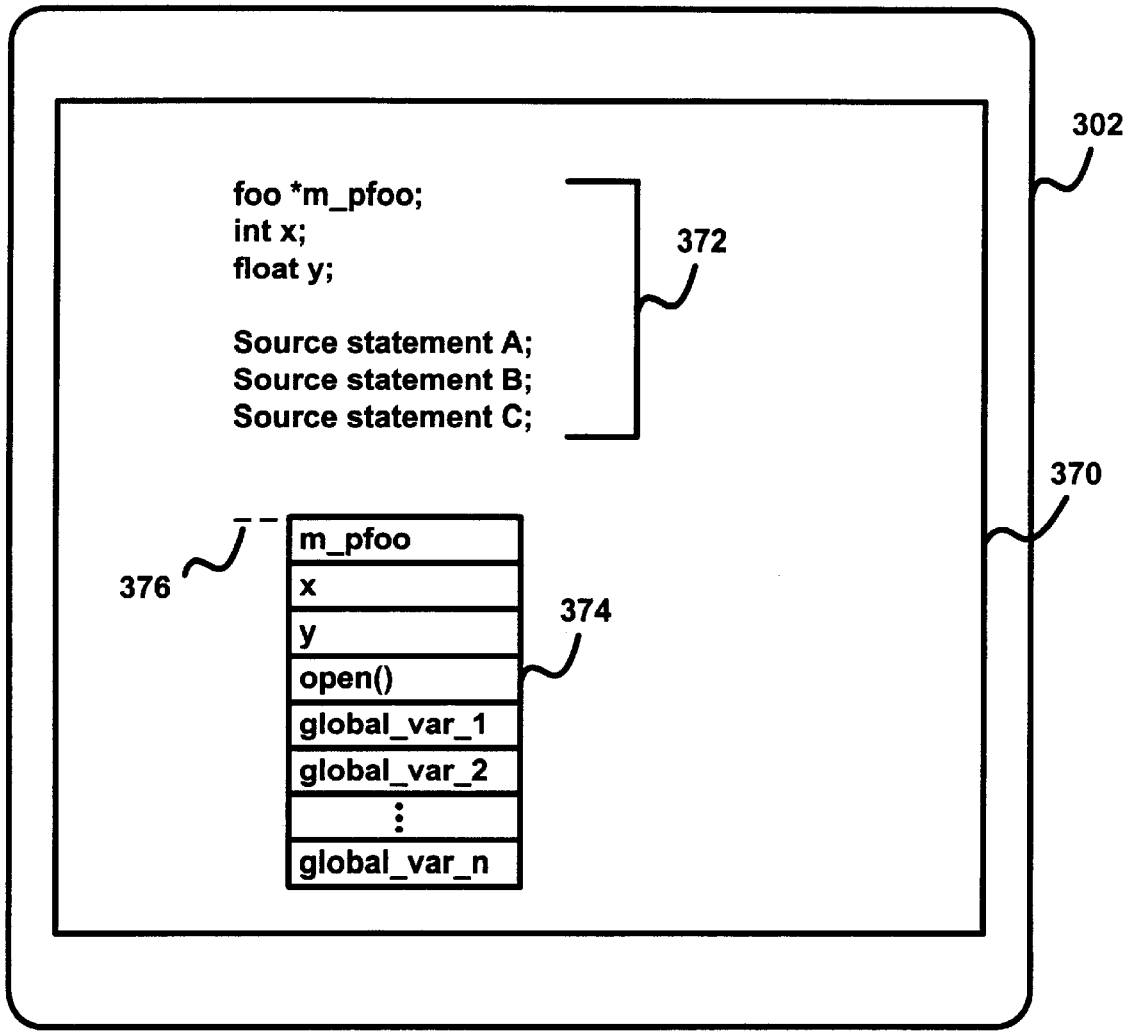

FIG. 3(a) presents a class definition, and FIGS. 3(b) and 3(c) illustrate representative screen shots of editing sessions using the class definition to demonstrate the automatic context-sensitive display of statement completion items. FIGS. 3(a), 3(b) and 3(c) are discussed in the context of the C++ programming language, however the invention is not so limited. The invention is adaptable to any programming language. Referring now to FIG. 3(a), a class definition 350 is presented for the class named "foo". Class foo has three member attributes, a length attribute 355, a width attribute 360, and a member function getArea 365. Length 355 and width 360 have an integer data type and function getArea returns a double precision floating point number. The class definition for class foo may be contained in the source code 210 file currently being edited, or more commonly, it may be contained in any of a number of files comprising the source code for the program.

Referring now to FIG. 3(b), a block diagram of a representative screen shot of an editor, according to one embodiment of the invention is presented. Within screen 300 of display 302, several previously entered lines of code 304 are shown, along with a current line of code 306. As the developer is editing line 306, the developer enters an expression component comprising object pointer name, "m_pfoo", which is an attribute that points at an object of class foo. The pointer name is followed by the pointer operator "→". The editor detects the pointer operator and invokes the completion module 220. Completion module invokes the method described below in reference to FIG. 4(b) and causes drop down box 308 to display a list of candidate expression components comprising class attributes of the class to which the object belongs. The developer may use the pointer device to highlight and select an attribute, which is then entered into the current line following the pointer operator.

In FIG. 3(c), a representative screen from an alternative embodiment of the invention is shown. Display 302 shows a screen 370 produced by the editor component of the IDE. Screen 370 contains source code statements 372, a current editing position located at cursor 376, and a drop down box 374. Source code statements 372 include a number of local variable declarations and arbitrary source code statements A, B and C. As shown, cursor 376 is in an area of the screen containing white space. In response to a pre-determined event, the completion module uses the method described below in reference to FIG. 4(b) to display a list of all of the potentially valid tokens and constructs that can be entered at this point in the code. The list is displayed in drop down box 374, and includes local variables, global variables, system function names, class name identifiers and any other token available as determined by the source code, project libraries, system libraries, and the programming language grammar. The user may select one of the entries in the drop down box 374, which causes it to be entered into the current source code at the cursor position 376.

In alternative embodiments of the invention, the drop down boxes described above, including boxes 308 and 374 are sorted and indexed as described in the patent application entitled "Indexing and Searching Across Multiple Sorted Arrays", which has been previously incorporated by reference.

It is desirable that program execution control not pass to the dialog box, thereby allowing the developer to continue adding characters to the statement. In this case the list of tokens in the drop down box is limited to those compatible with what the developer has entered or the dialog box is scrolled so that the nearest matching token is visible and highlighted. This token can be selected by a point and click operation or other means known in the art for selecting entities from a dialog or text box. In one embodiment of the invention, if, as the developer is typing, only a single matching candidate component exists, then the matching component is entered into the source code. In one embodiment of the invention, if the developer continues typing and enters a character that is not valid as an identifier name, the drop-down box disappears.

Thus, in this manner, embodiments of the invention provide for advantages not found within the prior art. As the source code is written (developed) by a computer programmer via the editor, the completion module is invoked upon the occurrence of an event to provide context-sensitive candidate expression components for completing the expression or statement. Unlike the prior art, the developer does not have to take focus away from the editor to consult paper documentation, on-line documentation, other source files, or other tool windows containing class hierarchies and the like. In addition, the expression components presented to the developer are guaranteed to be correctly spelled since they are taken from the source code definition. Also, the developer saves keystrokes, because the correct entry can typically be selected with a point and click operation as opposed to directly typing the expression into the editor.

Method

In this section of the detailed description, a method according to an embodiment of the invention is presented.

This description is provided in reference to FIGS. 4(a) and 4(b). The computerized method is desirably realized at least in part as one or more programs running on a computer— that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a computer program is executed by a processor of a computer from a medium therefrom to automatically complete programming language statements in source code as they are developed within an editor upon the occurrence of an event.

Referring now to FIG. 4(b), a flowchart of a method according to one embodiment of the invention is shown. In 400, at least a section of source code for a computer program is developed (written). Such source code may be written by a computer programmer utilizing an editor component in the IDE. FIG. 4(a) presents an example of such source code used to illustrate the method. In 405, an expression in the source code written in 400 is automatically completed upon the occurrence of an event. In one embodiment, the automatic completion in 405 is accomplished via 410, 415, 420 and 425.

In 405, the IDE detects an event indicating that automatic statement completion should be attempted. In one embodiment, the event occurs when the developer enters one or more separator characters that, as defined by the programming language, separate two components of an expression. For example, the pointer operator ("→") is frequently used to separate a component comprising an object pointer reference and a component comprising a member reference. Another separator commonly used is the dot (".") operator, which separates a direct object reference and a member reference. Those skilled in the art will recognize that other separators and events exist that could be used to trigger automatic statement completion. Furthermore, the example just described presents operators used in the C/C++ and Java language, however the invention is not so limited, and can be applied to any programming language.

In an alternative embodiment, the event occurs when the developer enters what is known in the art as a hot-key. A hot-key is a character such as a function button on the keyboard, or a short sequence of characters that are intended to invoke an action, in this case, automatic completion of the current statement.

In another alternative embodiment of the invention, the event occurs when the developer selects from a menu or dialogue box, or selects an icon on the screen. The content of the menu or dialogue box is context-sensitive, that is, the contents will be dependent on the source code that is currently being edited and the position of the cursor within the source code. The dialogue box, in an embodiment of the invention, is displayed by performing a click on a mouse button.

In a still further embodiment of the invention, the event occurs when a cursor, typically controlled by a pointer device, is positioned over an expression for at least a predetermined amount of time.

Other mechanisms to generate an event are known in the art that could be used instead of or in addition to the above-described mechanisms, and are within the scope of the invention.

Upon the detection of an event at 410, the method proceeds to 415 to parse the source code as currently written.

In one embodiment of the invention, the parser only parses the current function, if any, being edited. The parser returns information on tokens appearing at the current cursor position (if any), and identifying information regarding the token, such as its name, data type, and class membership. The parser may query the database for information regarding names, data types and program elements it discovers along the way before it gets to the current cursor position. The information that the parser returns depends upon the expression before the cursor position or the token at the cursor position.

Next, at 420 the method uses the information provided by the parser at 415 to perform a query on the database, which in one embodiment of the invention comprises an NCB file and a pre-built database that includes system header file information, MFC information, and ATL information. The data returned by the parser is used in the query to return context-sensitive data. For example, if the parser indicates that the token at the current cursor position is a pointer to a class member, the query to the database will only seek information on attributes for the particular class. If the cursor is over white space, the query will not be as limited, and will return a larger set of data comprising the valid tokens that can be entered at that point in the code. When the cursor is located within the code defining a function, the set includes the function parameters and local variables visible inside the function, i.e. the set of variables and other entities that are within the scope for the function.

The method then proceeds to 425, which organizes and displays the information returned by the query at 420. In addition, the information displayed may include other tokens valid at the current cursor position, such as programming language constructs comprising operators, separators, terminators, etc.

In one embodiment of the invention, the information is displayed in a drop down box. The developer can then pick an item from the drop down box, which is then inserted at the current cursor position in the source file. Those of ordinary skill in the art will recognize that alternatives to a drop down box are available, and within the scope of the invention.

In an alternative embodiment of the invention, the drop down box is sorted and indexed as described in the patent application entitled "Indexing and Searching Across Multiple Sorted Arrays", which has been previously incorporated by reference.

As the developer enters new characters into the source code, the new information can be used to either provide additional limitations to the query performed at 420, or the information can be used to filter the information returned by the query. Typically, this will result in the elimination of those entries that are no longer valid or incompatible with what the developer added. In an alternative embodiment of the invention, the list is scrolled down to the nearest matching entry, which is highlighted.

Conclusion

Context-sensitive automatic statement completion has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, the source code in its entirety could be parsed when automatic statement completion is desired.

Therefore, it is manifestly intended that this invention be limited only by the following claims and equivalents thereof.

We claim:

1. A method comprising:
   developing at least a section of source code for a computer program, said source code having tokens and entities;
   detecting a pre-determined event;
   issuing a query to a database containing entity information upon detecting the predetermined event, said query regarding at least one token of said plurality of tokens; and
   using the entity information to display a set of potentially valid entities relating to said at least one token of said plurality of tokens for potential prospective entry at a current position in the source code.

2. The method of claim 1, wherein developing the section of source code comprises utilizing an editor program.

3. The method of claim 1, wherein the predetermined event is selected from the group consisting of: entering a hot-key, causing a cursor to be positioned over a token for at least a pre-determined amount of time, selecting an icon, selecting a menu entry, pressing a mouse button, and highlighting one or more tokens.

4. The method of claim 1, wherein one of the plurality of tokens comprises a separator and wherein the predetermined event is when the separator is supplied to the editor.

5. The method of claim 1, wherein displaying the set of potentially valid entities displays the set in a drop-down box.

6. The method of claim 1, further comprising:
   parsing at least a subset of the source code to obtain parser data; and
   wherein the query includes at least a subset of the parser data.

7. The method of claim 1, wherein the database includes a dynamically updated component and a pre-built component.

8. A system comprising:
   an editor module to provide for developing source code for a computer program, said source code having a plurality of tokens that declare and define a plurality of entities;
   a database containing information about the entities; and
   a completion module invoked by the editor module upon the occurrence of a predetermined event and operative to query the database regarding at least one token of said plurality of tokens and display a set of potentially valid entities relating to said at least one token of said plurality of tokens for potential prospective entry at a current position in the source code.

9. The system of claim 8, wherein the predetermined event is selected from the group consisting of: entering a hot-key, causing a cursor to be positioned over a token for at least a pre-determined amount of time, selecting an icon, selecting a menu entry, pressing a mouse button, and highlighting one or more tokens.

10. The system of claim 8, wherein one of the plurality of tokens comprises a separator and wherein the predetermined event is when the separator is supplied to the editor.

11. The system of claim 8, further comprising:
    a parser operative to parse at least a subset of the source code and to return parser data; and
    wherein the completion module uses the parser data to query the database for information on the entities and includes at least a subset of the entities in the set of potentially valid entities.

12. The system of claim 8, wherein the database includes a dynamically updated component and a pre-built component.

13. The system of claim 8, wherein the display of the set of potentially valid entities comprises displaying the set of potentially valid entities in a drop-down box.

14. A computer comprising:
    a processor;
    a computer readable medium; and
    an editor module to provide for developing source code for a computer program, said source code having a plurality of tokens and a plurality of entities;
    a database containing entity information; and
    a completion module invoked by the editor module upon the occurrence of a predetermined event and operative to query the database regarding at least one token of said plurality of tokens and display a set of potentially valid entities relating to said at least one token of said plurality of tokens for potential prospective entry at a current position in the source code.

15. The computer of claim 14, wherein the predetermined event is selected from the group consisting of: entering a hot-key, causing a cursor to be positioned over a token for at least a pre-determined amount of time, selecting an icon, selecting a menu entry, pressing a mouse button, and highlighting one or more tokens.

16. The computer of claim 14, wherein one of the plurality of tokens comprises a separator and wherein the predetermined event is when the separator is supplied to the editor.

17. The computer of claim 14, further comprising:
    a parser operative to parse at least a subset of the source code and to return parser data; and
    wherein the completion module uses the parser data to query the database for token information and includes at least a subset of the entity information in the set of potentially valid entities.

18. The computer of claim 14, wherein the database includes a dynamically updated component and a pre-built component.

19. The computer of claim 14, wherein the display of the set of potentially valid entities comprises displaying the set of potentially valid entities in a drop-down box.

20. A computer-readable medium having computer-executable instructions for performing a method comprising:
    developing at least a section of source code for a computer program, said source code having a plurality of tokens and a plurality of entities;
    detecting a pre-determined event;
    issuing a query to a database containing token information upon detecting the predetermined event, said query regarding at least one token of said plurality of tokens; and
    using the entity information to display a set of potentially valid entities relating to said at least one token of said plurality of tokens for potential prospective entry at a current position in the source code.

21. The computer-readable medium of claim 20, wherein developing the section of source code comprises utilizing an editor program.

22. The computer-readable medium of claim 20, wherein the predetermined event is selected from the group consisting of: entering a hot-key, causing a cursor to be positioned over a token for at least a pre-determined amount of time, selecting an icon, selecting a menu entry, pressing a mouse button, and highlighting one or more tokens.

23. The computer-readable medium of claim 20, wherein one of the plurality of tokens comprises a separator and wherein the predetermined event is when the separator is supplied to the editor.

24. The computer-readable medium of claim 20, wherein displaying the set of potentially valid entities displays the set in a drop-down box.

25. The computer-readable medium of claim 20, further comprising:

parsing at least a subset of the source code to obtain parser data; and wherein the query includes at least a subset of the parser data.

26. The computer-readable medium of claim 20, wherein the database includes a dynamically updated component and a pre-built component.

\* \* \* \* \*

(12) EX PARTE REEXAMINATION CERTIFICATE (6545th)
United States Patent
Vaidyanathan et al.

(10) Number: US 6,305,008 C1
(45) Certificate Issued: Dec. 2, 2008

(54) AUTOMATIC STATEMENT COMPLETION

(75) Inventors: Shankar Vaidyanathan, Bellevue, WA (US); Philip Lucido, Redmond, WA (US); Sundeep Bhatia, Bellevue, WA (US)

(73) Assignee: Microsoft Corporation, Redmond, WA (US)

Reexamination Request:
No. 90/006,200, Jan. 25, 2002

Reexamination Certificate for:
Patent No.: 6,305,008
Issued: Oct. 16, 2001
Appl. No.: 09/191,781
Filed: Nov. 13, 1998

(51) Int. Cl.
*G06F 17/27* (2006.01)
*G06F 9/44* (2006.01)

(52) U.S. Cl. .................................... 717/111; 707/104.1
(58) Field of Classification Search .................. 717/111, 717/113, 114; 715/7, 8
See application file for complete search history.

(56) References Cited

U.S. PATENT DOCUMENTS

| | | | |
|---|---|---|---|
| 4,809,170 A | 2/1989 | Leblang et al. | 717/122 |
| 4,827,404 A | 5/1989 | Barstow et al. | 703/20 |
| 4,931,928 A | 6/1990 | Greenfeld | 364/300 |
| 5,006,992 A | 4/1991 | Sheirik | 364/513 |
| 5,070,478 A * | 12/1991 | Abbott | 715/531 |
| 5,079,700 A * | 1/1992 | Kozoll et al. | 715/531 |
| 5,140,521 A * | 8/1992 | Kozol et al. | 715/531 |
| 5,263,174 A | 11/1993 | Layman | 345/353 |
| 5,311,422 A | 5/1994 | Loftin et al. | 703/2 |
| 5,339,433 A * | 8/1994 | Frid-Nielsen | 717/141 |
| 5,377,318 A | 12/1994 | Wolber | 345/347 |
| 5,408,665 A * | 4/1995 | Fitzgerald | 717/163 |
| 5,430,836 A | 7/1995 | Wolf et al. | 715/744 |
| 5,450,545 A * | 9/1995 | Martin et al. | 717/109 |
| 5,479,536 A | 12/1995 | Comerford | 382/230 |
| 5,481,712 A * | 1/1996 | Silver et al. | 717/109 |
| 5,485,618 A * | 1/1996 | Smith | 715/710 |
| 5,537,630 A | 7/1996 | Berry et al. | 345/326 |
| 5,557,730 A * | 9/1996 | Frid-Nielsen | 715/839 |
| 5,577,241 A | 11/1996 | Spencer | 707/5 |
| 5,579,469 A | 11/1996 | Pike | 715/781 |
| 5,583,762 A * | 12/1996 | Shafer | 715/532 |
| 5,603,021 A * | 2/1997 | Spencer et al. | 707/4 |
| 5,627,958 A | 5/1997 | Potts et al. | 715/708 |
| 5,628,016 A | 5/1997 | Kukol | 395/704 |
| 5,644,737 A | 7/1997 | Tuniman et al. | 715/810 |
| 5,649,192 A * | 7/1997 | Stucky | 707/103 R |
| 5,649,222 A | 7/1997 | Mogilevsky | 715/533 |
| 5,671,403 A | 9/1997 | Shekita et al. | 707/3 |
| 5,673,390 A | 9/1997 | Mueller | 714/57 |

(Continued)

OTHER PUBLICATIONS

Van De Vanter, User Interaction in Language–Based Editing Systems, Dec. 1992, Computer Science Division (EECE), University of California, Berkeley, CA 94720.*
Ballance et al., The Pan Language–Based Editing System for Integrated Development Environments, 1990, ACM.*
Pangoli–Paterno, Automatic Generation of Task–oreinted Help, Nov. 1995, ACM.*
Moriyon–Szekely–Neches, Automatic Generation of Help from Interface Design Models, 1994, ACM.*
Susan D. Goodall, Online Help in the Real World, 1991, ACM.*

(Continued)

*Primary Examiner*—Majid A. Banankhah

(57) ABSTRACT

Automatic statement completion is disclosed. In one embodiment, a system includes an editor to provide for developing source code for a computer program, and a database containing information on entities in the source code. The system also includes a completion module invoked by the editor upon the occurrence of a predetermined event and operative to display a set of valid entities in response to a pre-determined event.

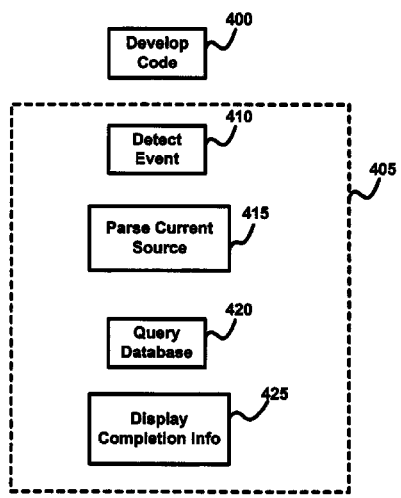

U.S. PATENT DOCUMENTS

| | | | | |
|---|---|---|---|---|
| 5,680,630 A | | 10/1997 | Saint-Laurent | 707/534 |
| 5,694,559 A | * | 12/1997 | Hobson et al. | 715/705 |
| 5,724,589 A | * | 3/1998 | Wold | 719/318 |
| 5,724,593 A | | 3/1998 | Hargrave, III et al. | 704/7 |
| 5,734,749 A | * | 3/1998 | Yamada et al. | 382/187 |
| 5,737,608 A | * | 4/1998 | Van De Vanter | 717/112 |
| 5,740,444 A | * | 4/1998 | Frid-Nielsen | 717/102 |
| 5,748,963 A | * | 5/1998 | Orr | 717/131 |
| 5,748,975 A | * | 5/1998 | Van De Vanter | 715/531 |
| 5,752,058 A | * | 5/1998 | Van De Vanter | 715/531 |
| 5,754,737 A | * | 5/1998 | Gipson | 706/11 |
| 5,778,402 A | * | 7/1998 | Gipson | 715/530 |
| 5,781,720 A | | 7/1998 | Parker et al. | 714/38 |
| 5,787,431 A | * | 7/1998 | Shaughnessy | 707/100 |
| 5,790,778 A | | 8/1998 | Bush et al. | 709/201 |
| 5,798,757 A | | 8/1998 | Smith | 345/338 |
| 5,802,262 A | * | 9/1998 | Van De Vanter | 714/1 |
| 5,805,889 A | * | 9/1998 | Van De Vanter | 717/107 |
| 5,813,019 A | * | 9/1998 | Van De Vanter | 715/512 |
| 5,825,308 A | | 10/1998 | Rosenberg | 341/20 |
| 5,825,355 A | | 10/1998 | Palmer et al. | 715/712 |
| 5,844,554 A | | 12/1998 | Geller et al. | 345/333 |
| 5,845,120 A | | 12/1998 | Reddy et al. | 717/125 |
| 5,845,300 A | * | 12/1998 | Comer et al. | 715/508 |
| 5,850,561 A | | 12/1998 | Church et al. | 715/532 |
| 5,854,936 A | * | 12/1998 | Pickett | 717/162 |
| 5,857,212 A | * | 1/1999 | Van De Vanter | 715/519 |
| 5,859,638 A | | 1/1999 | Coleman et al. | 715/786 |
| 5,872,974 A | | 2/1999 | Mezick | 717/109 |
| 5,877,758 A | | 3/1999 | Seybold | 715/866 |
| 5,905,892 A | | 5/1999 | Nielsen et al. | 717/145 |
| 5,911,059 A | | 6/1999 | Profit, Jr. | 703/23 |
| 5,911,075 A | | 6/1999 | Glaser et al. | 717/4 |
| 5,923,881 A | | 7/1999 | Fujii et al. | 717/125 |
| 5,924,089 A | | 7/1999 | Mocek et al. | 707/4 |
| 5,959,629 A | | 9/1999 | Masui | 345/347 |
| 6,012,075 A | | 1/2000 | Fein et al. | 715/540 |
| 6,016,467 A | | 1/2000 | Newsted et al. | 704/9 |
| 6,018,524 A | | 1/2000 | Turner et al. | 370/392 |
| 6,023,715 A | | 2/2000 | Burkes et al. | 715/514 |
| 6,026,233 A | * | 2/2000 | Shulman et al. | 717/113 |
| 6,053,951 A | * | 4/2000 | McDonald et al. | 717/109 |
| 6,061,513 A | | 5/2000 | Scandura | 395/701 |
| 6,071,317 A | | 6/2000 | Nagel | 717/128 |
| 6,115,544 A | | 9/2000 | Mueller | 714/57 |
| 6,119,120 A | | 9/2000 | Miller | 707/101 |
| 6,163,879 A | | 12/2000 | Mackey | 717/111 |
| 6,205,579 B1 | | 3/2001 | Southgate | 717/173 |
| 6,208,339 B1 | * | 3/2001 | Atlas et al. | 715/780 |
| 6,247,020 B1 | * | 6/2001 | Minard | 707/104.1 |
| 6,269,475 B1 | | 7/2001 | Farrell et al. | 717/113 |
| 6,275,976 B1 | | 8/2001 | Scandura | 717/120 |
| 6,305,008 B1 | | 10/2001 | Vaidyanathan et al. | 717/111 |
| 6,311,323 B1 | * | 10/2001 | Shulman et al. | 717/111 |
| 6,314,559 B1 | * | 11/2001 | Sollich | 717/111 |
| 6,901,579 B1 | | 5/2005 | Suguta | 717/108 |
| 2002/0100016 A1 | | 7/2002 | Van De Vanter et al. | 717/112 |

OTHER PUBLICATIONS

Microsoft Corporation, Syntax at Your Fingertips, Automatic Statement Building, Oct. 1996, Microsoft Office Developer Forum—Microsoft Access Tip.*

Microsoft Corporation, Let Microsoft Access Type Your Code for You, 2002, Microsoft Access Module Tips.*

Goldberg, Smalltalk—The Interactive Programming Environment, 1984, Xerox Palo Alto Research Center.*

Microsoft Corporation, Creating Your First Event Procedure, 2003, MSDN Home>MSDN Library>Microsoft Office>Chapter 1—Introducing Visual Basic.*

Sukaviriya et al. Automatic Generation of Textual, Audio, and Animated Help in UIDE: The User Interface Design Environment, 1994, ACM.*

Ambler–Burnett, Influence of Visual Technology on the Evolution of Language Environments, Oct. 1989, IEEE.*

Walter Savitch, Problem Solving With C++ The Object of Programming, 1996, Chapter 11, Pointers and Dynamic Arrays.*

Google, Online Definition of "deference", Mar. 2006.*

University of Hawai, Pointers to Structures, retrieved from the Internet on Mar. 23, 2006, http://www–ee.eng.hawaii.edu/~tep/EE160/Book/chap12/subsection2.1.1.4.html.*

InstallShield DevStudio, Structure Pointer Operator, retrieved form the Internet on Mar. 23, 2006, http://helpnet.installshield.com/robo/projects/devstudio9helplangref/LangrefStructure_pointer_operator.html.*

Hegazi, A. et al., "Visual Craft: A Visual Integrated Development Environment," *Proceedings of the Second IEEE Symposium on Computers and Communications,* Jul. 1997, 210–214.

Kaiser, G. et al., "Intelligent Assistance for Software Development and Maintenance," *IEEE Software,* May 1998, 5(3), 40–49.

Microsoft Corporation, "Getting Results with Microsoft Office for Windows 95, Version 7.0," *Microsoft Press,* 1995, 303.

Terveen, L. et al., "Intelligent Assistance for Software Construction: A Case Study," *Proceedings of the Ninth Knowledge–Based Software Engineering Conference,* Sep. 1994, 14–21.

Microsoft Corporation, "Your First Visual Basic Application," *Programmer's Guide, Visual Basic Programming System for Windows, Version 3.0,* 1993, Chapter 2, 15–30.

Microsoft Corporation, "Your First Visual Basic Application," *Programmer's Guide, Visual Basic Programming System for Windows, Version 4.0,* 1995, Chapter 2, 15–34.

Microsoft Corporation, "Getting Started with Visual Basic," *Programmer's Guide, Visual Basic Programming System for Windows 95 and Windows NT, Version 5.0,* 1997, Chapter 2, 13–31.

Aho et al., *Compilers Principles, Techniques and Tools,* Sep. 12, 1985, Chapters 1–5, 1–336.

"Application Development—Programmers Need to Meet More Demands Than Ever. These Products Can Help," *Windows Magazine,* 1997, 806A, 123–124.

Azuma, M. et al., "SPD: A Humanized Documentation Technology," *Visual Programming Environments Paradigms and Systems, IEEE,* 1985, 115–123.

Bahlke, R. et al., "The PSG System: From Formal Language Definitions to Interactive Programming Environments," *ACM,* 1986, 547–576.

Ballance, R.A. et al., "The PAN Language–Based Editing System," *ACM Trans.,* 1992, 95–127.

Borras, P. et al., "Centaur: the system," *ACM,* 1988, 14–24.

Comeau et al., "A Window Based Help, Tutorial and Documentation System," *ACM,* Jan. 1993, 71–81.

Chomsky, N., "Three Models for Description of Language," *IRE Trans. Information Theory,* 1956, 113–124.

Coffee, P., "Delphi 3.0: Proof that Pascal Lives," *Windows Sources,* 1997, 5(6), 92–93.

Donzeau–Gouge, V. et al., "Programming Environments Based on Structured Editors: The MENTOR Experience," *Interactive Programming Environments,* 1984, 128–140.

Frank et al., "Authoring a Hypertext Help Manual," *ACM*, 1995, 238–245.

IBM Technical Disclosure Bulletin, "Automated Code Checker," Sep. 1993, 36(09B), 239–240.

IBM Technical Disclosure Bulletin, "Smalltalk Tokenizer and Backus–Naur Form Perser," Dec. 1994, 37(12), 313–316.

Lang, B., "On the Usefulness of Syntaz Directed Editors," *Advanced Programming Environments*, 1986, 47–51.

Lesynski, S., *Access 97 Expert Solutions*, Jan. 17, 1997, 2 pages.

Letovsky, S. et al., "Delocalized Plans and Program Comprehension," *IEEE*, 1986, 41–49.

Microsoft Website, "What's New in Microsoft Access 97," 2003, 3 pages.

Microsoft Office Developer Web Forum, "Microsoft Access 97 Conversion Issues," Jan. 3, 1997, 14 pages.

Microsoft Corporation, "Building Com Components that Take Fule Adv Visual Basic Scripting," IVO Solmre, Feb. 24, 1998, 15 pages.

Neal, L.R., "Cognition–Sensitive Design and User Modeling for Syntax–Directed Editors," *ACM*, 1987, 99–102.

Nesbitt, K., "Borland Delphi: Third Time's A Charm," *Data-based Web Advisor*, 1997, 15(7), 70–76.

Nicolaisen, N., "Go Beyond Text Editing, Using the Advances in Source Insight," *Computer Shopping*, 1996, 16(4), 584–587.

Notkin, D. "The Gandalf Project," *J. Systems and Software*, 1985, 91–105.

Olsson, "Population Management for Automatic Design of Algorithms Through Evolution," *IEEE*, Sep. 1998, 592–597.

Parker, T., "TakeFive's SniFF Plus Let You Tailor Your Own Development Environment," *UNIX Review*, 1997, 61–62.

Perry, G., Overview of Book with Screen Example, "Visual Basic 5 Night School," *Programming Languages*, Mar. 1997, 2 pages.

Powell, J. E., "Delphi 3 Client/Server Suite—Delphi's RAD New Features Shine," *Windows Magazine*, 1997, 806, 158–159.

Reps, T. W. et al., *The Synthesizer Generator Reference Manual*, Third Edition, 1988, 1–171.

Rubenking, N., "Delphi 3 Delivers Potent Programming," *PC Magazine*, 1997, 16(15), 64–65.

Soloway, E. et al., "Impirical Studies on Programming Knowledge," *IEEE*, 1984, 595–609.

Stallman, R.M. et al., "The Extensible, Customizable Self–Documenting Display Editor," *ACM*, 1981, 147–156.

Taft, D.K., "Borland Debuts Delphi 3 Suite," *Computer Reseller News*, 1997, 734, 28–29.

Teitelbaum, T. et al., "The Cornell Program Synthesizer: A Suntaz–Directed Programming Environment," *Communications of the ACM*, 1981, 563–573.

Van De Vanter, M.L. et al., *Structure–based Editors and Environments*, "Coherent User Interfaces for Language–Based Editing Systems," 1996, Chapter 1, 20–69.

Van De Vanter, M.L., *Practical Language–Based Editing for Software Engineers*, Sun Microsystems Labs, 1995, 251–267.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–26 are cancelled.

* * * * *